(12) United States Patent
Krueger et al.

(10) Patent No.: US 6,247,041 B1
(45) Date of Patent: Jun. 12, 2001

(54) MULTIPROCESSOR COMPUTER SYSTEM WITH USER SPECIFIABLE PROCESS PLACEMENT

(75) Inventors: Phillip Eric Krueger, Lake Oswego; Corene Casper, Beaverton; Kenneth Frank Dove, Tigard; Brent Alan Kingsbury; Paul Edward McKenney, both of Beaverton, all of OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/920,671

(22) Filed: Aug. 29, 1997

(51) Int. Cl.[7] .................................................. G06F 9/00
(52) U.S. Cl. ................................. 709/104; 709/100
(58) Field of Search ............................... 709/100, 102, 709/103, 104, 105, 107, 106; 711/170, 171, 148

(56) References Cited

U.S. PATENT DOCUMENTS

| | | | |
|---|---|---|---|
| 4,849,877 | * 7/1989 | Bishop et al. | 364/2 |
| 5,109,512 | * 4/1992 | Bahr et al. | 709/103 |
| 5,774,731 | * 6/1998 | Higuchi et al. | 710/200 |

OTHER PUBLICATIONS

"Preemptable Remote Execution Facilities for the V–System," by Theimer, Lantz and Cheriton, Computer Science Department, Stanford University, pp. 2–12 (1985).

"Load Balancing in Homogeneous Broadcast Distributed Systems," by Livny and Melman, Department of Applied Mathematics, The Weizmann Institute of Science, pp. 47–55 (1982).

"The Diverse Objectives of Distributed Scheduling Policies," by Krueger and Livny, Computer Science Department, University of Wisconsin–Madison, pp. 242–249 (1987).

"Adaptive Load Sharing in Homogeneous Distributed Systems," *IEEE Transactions of Software Engineering*, vol. 12 No. 5, by Eager, Lazowska and Zahorjan (1986).

"A Comparison of Receiver–Initiated and Sender–Initiated Dynamic Load Sharing," by Eager, Department of Computational Science University of Saskatchewan, and Lazowska and Zahorjan, Department of Computer Science University of Washington, pp. 1–16 (1985).

"Transparent Process Migration: Design Alternatives and the Sprite Implementation," *Software–Practice and Experience*, vol. 21(8), by Douglis and Ousterhout, Computer Science Division, Electrical Engineering and Computer Sciences, University of California–Berkeley, pp. 758–785 (1991).

* cited by examiner

*Primary Examiner*—Majid Banankhah
(74) *Attorney, Agent, or Firm*—Klarquist Sparkman Campbell Leigh and Whinston LLP (57) ABSTRACT

An apparatus and method is disclosed for allowing a user process to advise or control an operating system to place a process on a particular node or a node within a set of nodes. When a user process makes a system call to the operating system to either create, execute, move, or attach a process, a specified system resource is passed to the operating system with the system call. This advises the operating system to store the process on a node containing the system resource identified in the system call. The user process can also require the operating system to store a process on a particular node.

26 Claims, 8 Drawing Sheets

MULTIPROCESSOR COMPUTER SYSTEM WITH USER SPECIFIABLE PROCESS PLACEMENT

FIELD OF THE INVENTION

This invention relates generally to multiprocessor computer systems with distributed shared memory. More particularly, this invention relates to the placement of processes running on nodes of such a multiprocessor computer system.

BACKGROUND OF THE INVENTION

Multiprocessor computers by definition contain multiple processors that can execute multiple parts of a computer program or multiple programs simultaneously. In general, this parallel computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Shared-memory multiprocessor computers may also be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared-memory systems are often called non-uniform memory access (NUMA) machines. By contrast, in centralized shared-memory computers, the memory is physically in just one location. Such centralized shared-memory computers are called uniform memory access (UMA) machines because the memory is equidistant in time and space from each of the processors. Both forms of memory organization typically use high-speed cache memory in conjunction with main memory to reduce execution time.

Multiprocessor computers with distributed shared memory are often organized into nodes with one or more processors per node. The nodes interface with each other through a network by using a protocol, such as the protocol described in the Scalable Coherent Interface (SCI)(IEEE 1596). An operating system is located on the system. The operating system is a program that performs a number of tasks central to the computer's operation including managing memory, files and peripheral devices, launching application programs, and allocating system resources.

The operating system typically implements a process model. A user process (i.e., a process from an application program) provides an execution environment for a program and allows the program to make requests (also called system calls) to a kernel (which is the heart of the operating system) through an application programming interface (API). The system calls allow the user process to control the multiprocessor computer so that user "jobs" are carried out. For example, a user process might desire access to system resources, such as an I/O device (e.g., disk drive, tape drive, CD ROM, etc.), a shared memory segment, a file, a processor, another process, etc. A user process has several components including the program itself (i.e., executable instructions also called "text"), private data (e.g., local variables), a stack, and page tables.

A problem arises when running an operating system on a multinode environment. That is, the user has knowledge of what system resources the process needs, but does not know which nodes those resources are located on. The operating system, on the other hand, knows where the resources are located, but does not know what resources a process needs until a system call is made to access the resource. Consequently, the operating system may create and move processes somewhat randomly and independent of future process needs. For example, when a process is first created by the operating system, the process may be stored on a different node from a resource that it frequently accesses. The memory associated with the process also may be located on a different node from the processor that is executing the process. Additionally, components of the process may be split and distributed amongst different nodes in the computer system. For example, the stack may be located on a different node from the program. The page tables and private data may be located on yet another node. Such random placement of process components leads to inefficiencies in program execution requiring a large number of internode memory accesses.

An objective of the invention, therefore, is to provide a distributed shared-memory multiprocessor computer system that maximizes efficiency by storing a user process near a system resource the process frequently accesses. A further objective of the invention is to allow a user to control or advise the operating system where to store processes or what resources the process frequently accesses. Yet a further objective of the invention is to provide such a system where components of the process (e.g., stack, page tables, etc.) are stored on one node.

SUMMARY OF THE INVENTION

The present invention allows a user process to advise or control where an operating system in a distributed shared-memory multiprocessor computer system stores a process. Additionally, the user can advise the operating system of the system resources the process frequently accesses. Still further, different components of the process are stored on a single node to maximize efficiency.

In one aspect of the invention, a user process may advise an operating system to store a process (i.e., another process or the user process itself on a node having a specified system resource. When the user process makes a system call to the operating system to either create or move a process, a specified system resource is passed with the call to the operating system. This advises the operating system to store the process on a node containing the specified system resource. The operating system does not have to accept this advice. Other factors, such as the node containing the system resource is overloaded, may cause the operating system to chose a different node. In any event, the process is stored on a node that maximizes efficiency in execution of the process.

In another aspect of the invention, the user process may advise the operating system to store a process on a particular node (rather than a node having a particular system resource). In this case, a set of one or more nodes is passed to the operating system in a system call. The operating system uses the set as advice to store the process on a node within the set. Again, the advice can be ignored if the operating system determines that maximum efficiency can be achieved by storing the process on a different node.

In yet another aspect of the invention, the user process can require (rather than advise) the operating system to store a process on a particular node or on a node having a particular system resource. This provides control over the operating system not traditionally available.

In still a further aspect of the present invention, a user process can request the operating system for information not typically available to user processes. That is, the user process can ask what nodes in the system contain a particular system resource. In response to such a request, the operating system returns to the user process the nodes containing the system resource. The user process can use this information to determine what nodes processes should be stored on.

In yet another aspect of the present invention, a user process can advise or control the operating system to "attach" a process to a system resource. Once attached to the system resource, the location of the process is dependent upon the location of the system resource. For example, if the system resource is eventually moved to another node, the process is automatically moved to a node containing the system resource. The attachment can exist for the life of the process. A "detach" system call, however, can undo the attachment so that the process may be moved independent of the system resource.

The apparatus and method according to the invention has several advantages. Foremost, the process is located on only one node to maximize efficiency. Additionally, the user can provide advice to the operating system as to where to store processes. Further, a process can be attached to a system resource.

The foregoing and other objects, features, and advantages of the invention will become more apparent from the following detailed description of the preferred embodiments which proceeds with reference to the following drawings.

DETAILED DESCRIPTION OF THE PREFERRED EMBODIMENTS

System Overview

Figure 1:
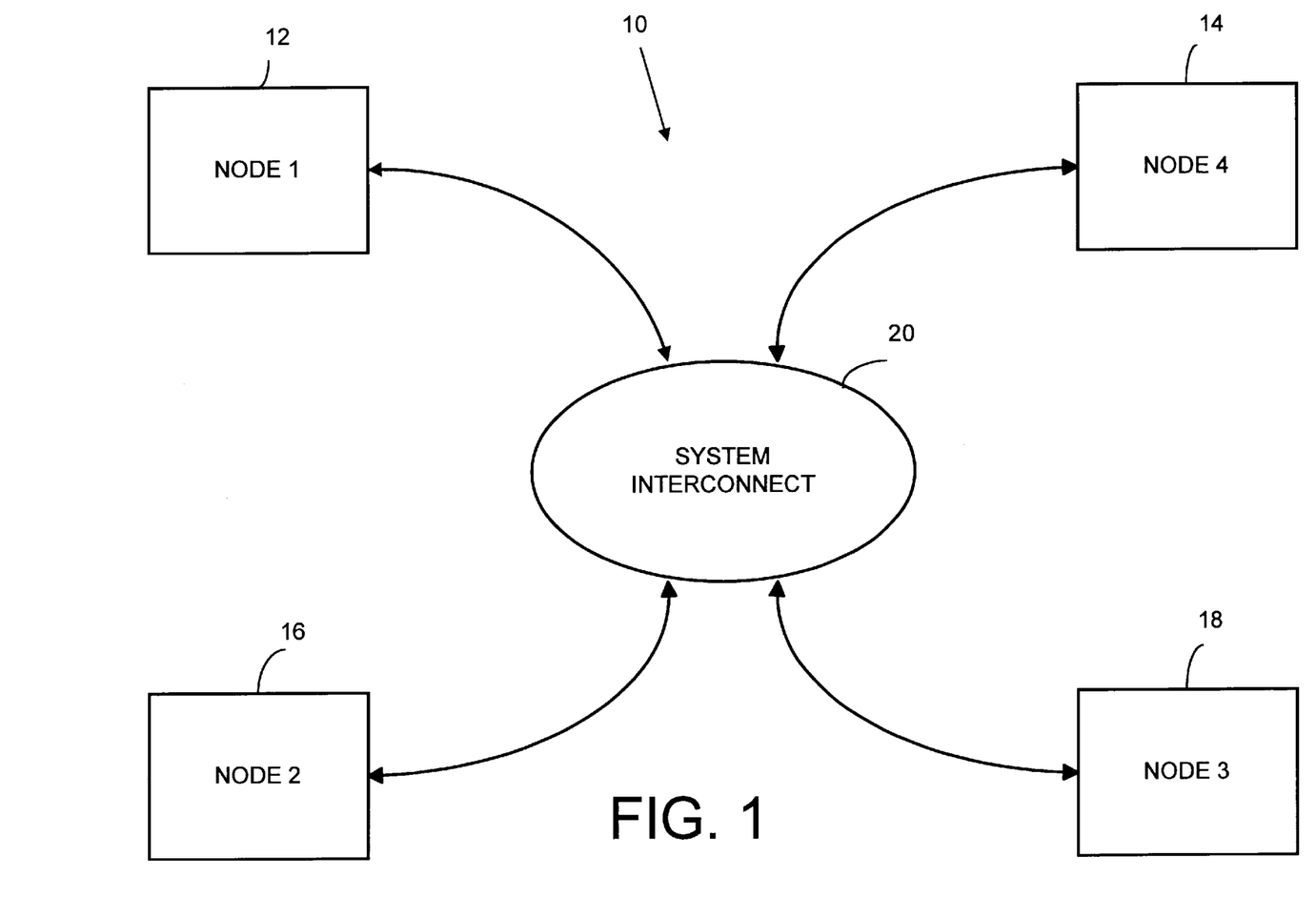
FIG. 1 is a block diagram of a multinode, multiprocessor computer system with a system interconnect coupling the nodes together.

FIG. 1 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12–18 are shown connected by a system interconnect 20 (i.e., a network) that permits any node to communicate with any other node. Specifically, the purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including *IEEE Std* 1596–1992 (Aug. 2, 1993) and *Multiprocessor Interconnection Using SCI,* a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, Computer Sciences Technical Report #1058, University of Wisconsin—Madison, which is hereby incorporated by reference.

Node Overview

Figure 2:
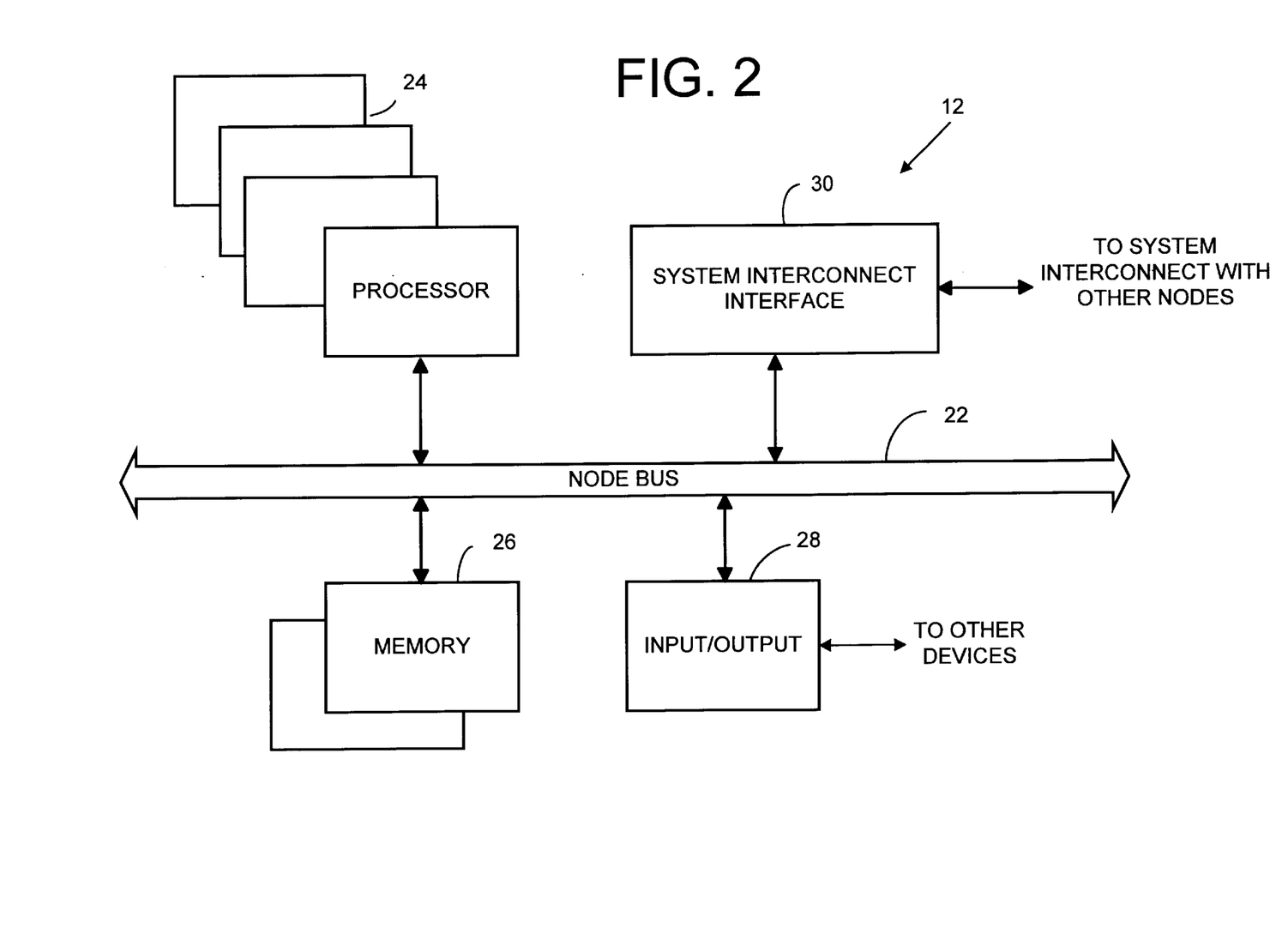
FIG. 2 is a block diagram of one of the nodes of the computer system of FIG. 1.

A block diagram of node 12 on system 10 is shown in FIG. 2. The node includes a conventional symmetrical multiprocessor (SMP) node bus 22 for connecting multiple data processors 24 to local memory 26. For clarity, nodes 12–18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to access data stored on another node. The interface 30 also contains a remote cache in the present embodiment, although this combination is not required for the invention. The remote cache could also be separate from the system interconnect interface.

Operating System Overview

Figure 3:
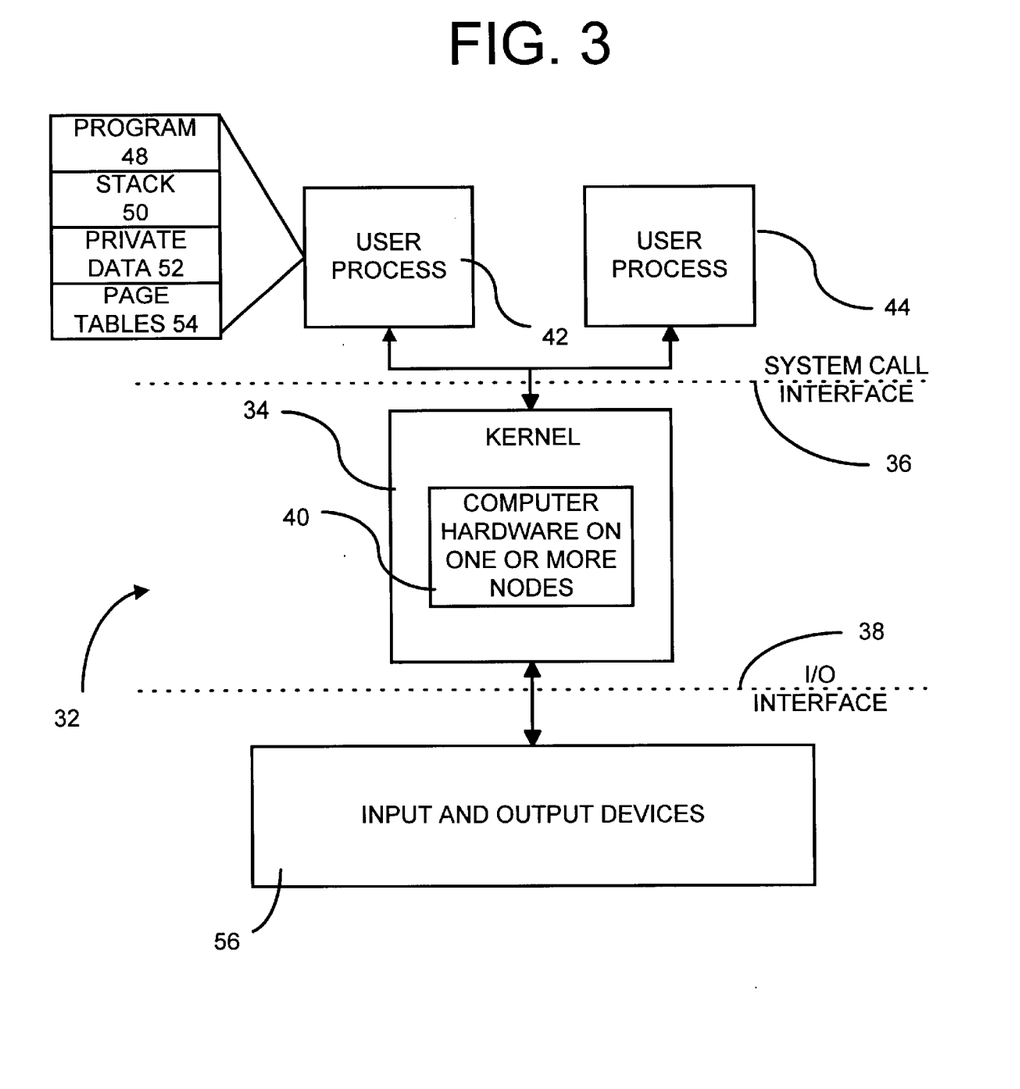
FIG. 3 is a block diagram showing an operating system running on the computer system of FIG. 1.

FIG. 3 shows an operating system 32 for computer system 10, which includes a kernel 34, a system call interface 36 and an I/O interface 38. The illustrated operating system is a UNIX-based operating system, such as DYNIX/ptx, BSD, SVR3, UnixWare, PC UNIX, etc. Other UNIX-based operating systems or other operating systems generally may also be used. For general information on UNIX-based operating systems, see Bach, M. J., *The Design of the UNIX Operating System,* Prentice-Hall, 1986; Vahalia, U., *Unix Internals: The New Frontier,* Prentice-Hall, 1996; McKusick, M., et al., *The Design and Implementation of the* 4.4 *BSD Operating System,* Addison-Wesley, 1996, which are hereby incorporated by reference. Kernel 34 is a program stored in memory 26 on one or more nodes. Memory 26, processors 24, and other hardware shown on node 12 in FIG. 2 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CD ROM, etc.), a shared memory segment, a file, a process, a processor, etc.

User requests are generated by one or more user processes 42 and 44 that run on system 10. User process 42 includes a program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single—and multi-level page tables are represented by page table 54. Process 44 includes a similar environment to that of process 42. Although two user processes are shown, any number of processes may be run concurrently on the multiple processors of system 10. The user processes make requests to kernel 34 through "system calls" which are passed to the kernel by system call interface 36.

Kernel 34 accesses I/O devices 56 through I/O interface 38. For example, if user process 42 requests information from a disk drive (not shown) included within I/0 devices 56, user process 42 makes a system call to operating system 32. Operating system 32 uses I/0 interface 38 to retrieve the information from the disk drive and returns the information to user process 42.

Operating system 32 provides several system calls to create and terminate processes and to execute programs. For example, in UNIX, the "fork" system call creates a new process and the "exec" system call executes a program. The fork system call is generated by a "parent" process. The new process that is created by the fork system call is a "child" process and is nearly an exact clone of the parent. Typically, the child process makes an exec system call shortly after the fork system call to instantiate and begin executing a program, such as program 48. The fork and exec system calls may take a variety of forms, such as execе, execve, execvp, and vfork. Each form takes a slightly different set of arguments, but generally performs similar functions. The current forms of fork system calls, however, do not allow the user process making the system call to control which node the process is created on. Similarly, current forms of exec system calls do not allow the user process to control which node the program should be executed on.

Overview of User Specifiable Process Placement

Figure 4:
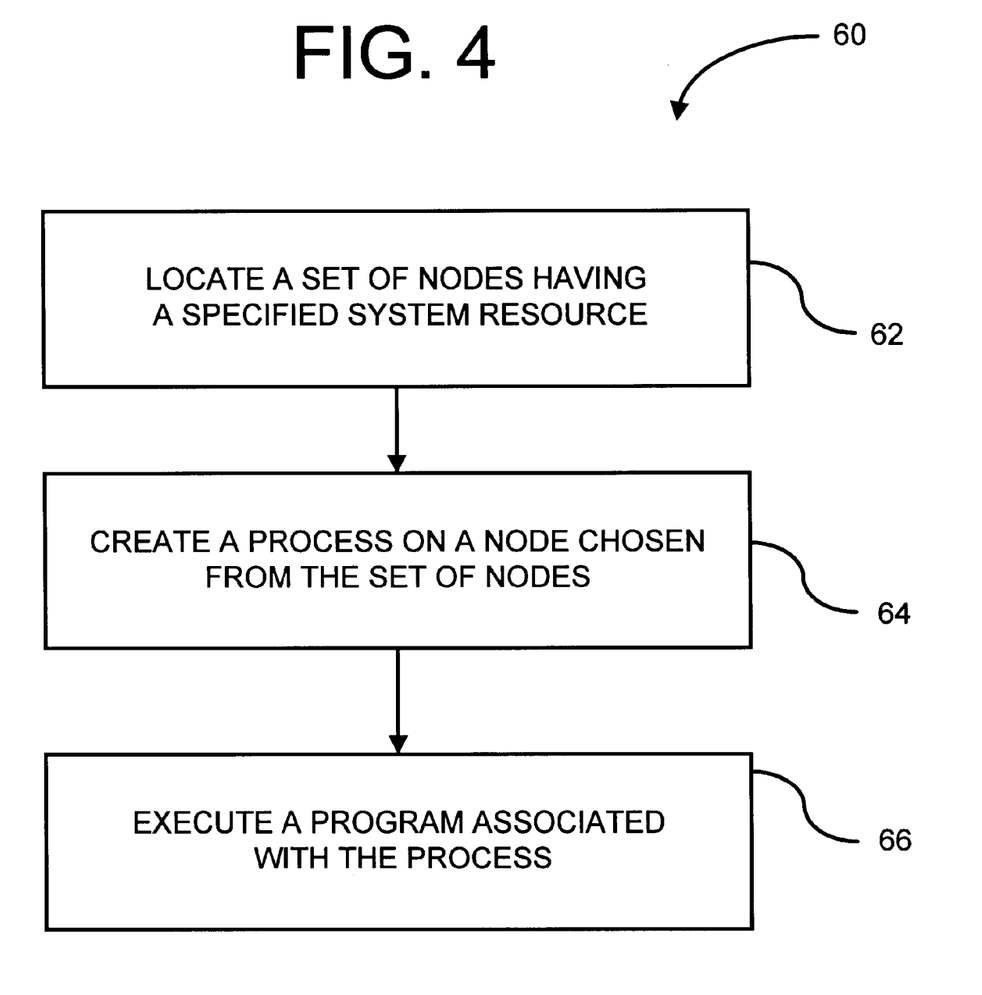
FIG. 4 is a flow chart of a method according to the present invention for creating a process on a specified node and executing a program on that node.

FIG. 4 is a flow chart 60 of a method for creating a process and executing a program according to the invention. For purposes of illustration, process 44 (FIG. 3) is considered a parent process and process 42 is a child process. Parent process 44 advises or controls which node child process 42 is stored on. Additionally, components 48, 50, 52, and 54 of process 42 are stored on one node for maximum efficiency in executing program 48. As further described below, flow chart 60 shows three steps 62, 64, and 66, with each step being a separate system call. It is understood by those skilled in the art that the same functionality can be achieved with just one or two system calls. Alternatively, the three system calls can be broken down into additional system calls so that four or more system calls are needed.

Step 62 shows a first system call made by parent process 44. This system call is called a "locate" system call for purposes of this application. The locate system call requests operating system 32 to locate a set of one or more nodes having a specified system resource. After the operating system receives the request from system call interface 36, the operating system identifies a set of nodes containing the system resource and returns the set to process 44. Details of the locate system call are shown and described below with reference to FIG. 5.

Step 64 shows a subsequent, second system call made by parent process 44. After the set of nodes containing the system resource has been identified, parent process 44 requests operating system 32 to create a new child process 42 on one of the nodes in the set. The second system call (step 64) is a modification of a traditional fork system call. There are two distinctions between the traditional and the modified fork system calls: (1) the modified fork system call causes process 42 (including all of its components) to be stored on just one node, rather than multiple nodes and (2) the modified fork system call provides advice to operating system 32 on which node to store process 42. Operating system 32 is not required to create process 42 on any particular node, but takes the set of nodes passed to it by process 44 into consideration in choosing a node to store the process. Other considerations include processor and memory availability on a node. As is explained more fully below, parent process 44 also can require operating system 32 to store process 42 on a specified node, if desired. Details of the modified fork system call are shown and described further below with reference to FIG. 6.

Step 66 shows a subsequent, third system call. This call is typically made by process 42, although process 44 could also be used to make the system call. In this example, a more traditional UNIX exec system call executes program 48 on the desired node.

In summary, method 60 created a new process on a desired node using a modified fork system call and a program was executed on the desired node using a more traditional exec system call. Another possible method for creating process 42 and executing program 48 on a desired node is to use a more traditional fork system call and a modified exec system call. The more traditional fork system call creates a process 42. The modified exec system call can be used to specify a node that program 48 should be executed on. This modified exec system call advises or controls operating system 32 to instantiate process 42 on the desired node and then execute program 48 on that node. Details of the modified exec system call are shown and described further below with reference to FIG. 7.

Locating Nodes Having a Specified System Resource

Figure 5:
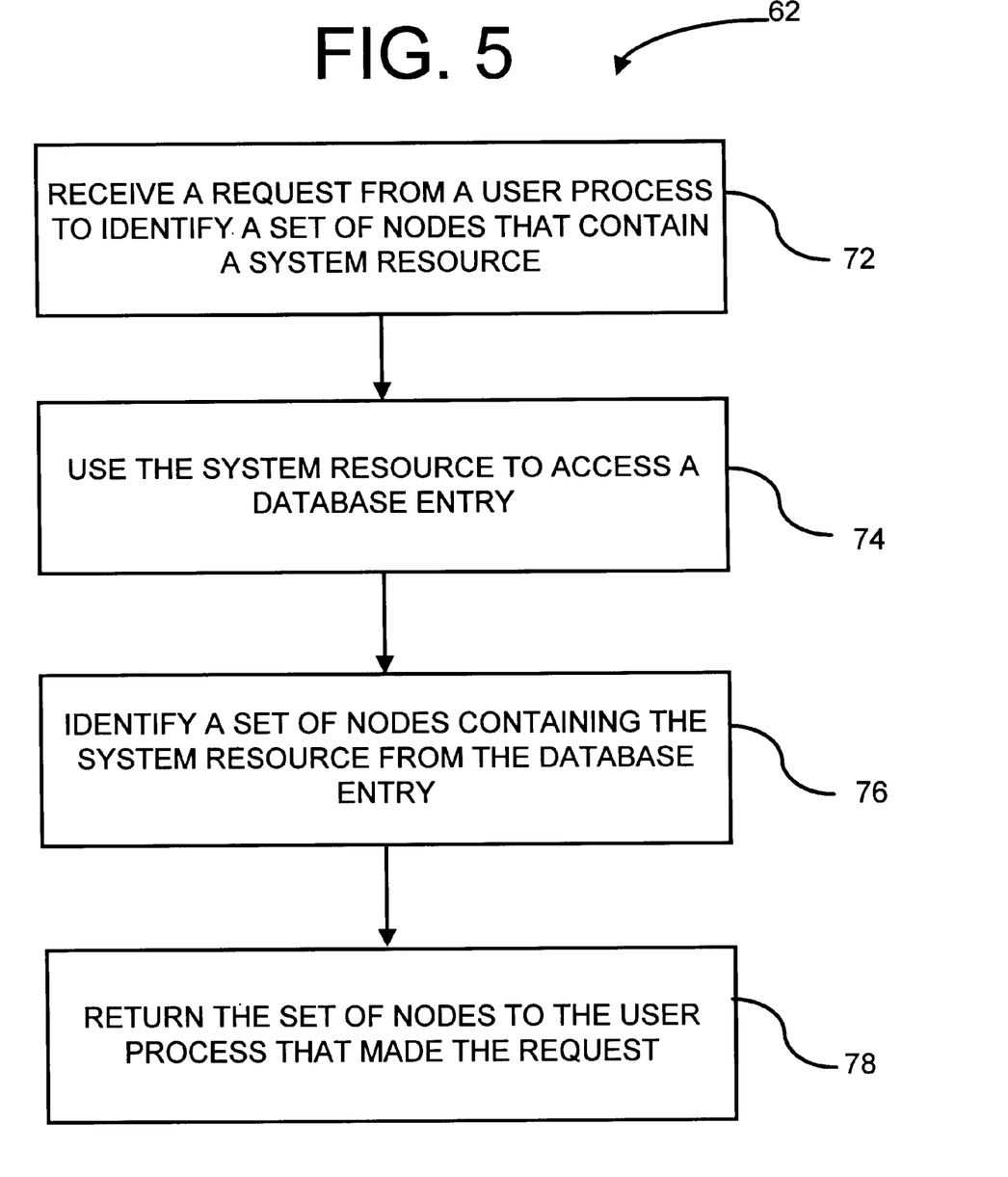
FIG. 5 is a flow chart of a method for locating a node having a specified system resource.

FIG. 5 is a flow chart of a method for locating a node having a specified system resource. The steps of the method are carried out by operating system 32 in response to the locate system call (step 62) of FIG. 4. Step 72 shows that parent process 44 makes a request to operating system 32 for a set of nodes that contain a specified system resource. A sample locate system call is as follows:

locate(resource_type, resource_id, return_arg)
    rsrcdescr_t *resource_id
    typedef union rsrcdescr {
        quadset_t rd_quadset;
        int rd_fd;
        char *rd_pathname:
        int rd_shmid;
        pid_t rd_pid;
    } rsrcdescr_t;

The locate system call has 3 parameters: resource_type, resource_id, and return_arg. The resource_type parameter identifies the type of system resource the user wants to access. For example, the resource type may be a node, file, device (e.g., tape drive, disk drive, processor, etc.), socket, FIFO, shared-memory segment, another process, etc. The resource_id parameter specifically identifies a particular resource in the system of the type defined by resource_type. For example, the resource_id may identify a particular tape drive or process identification. Together, the resource_type and resource_id parameters identify a system resource. This system call can be modified so that only one parameter is used to identify the system resource, instead of two. The system resource may reside on one or more nodes in the system. For example, multiple nodes may be able to access a tape drive.

The return_arg parameter is a return argument from operating system 32. The return_arg is a set of bits with at least one bit for each node in system 10 that the resource can be located on. If operating system 32 identifies or determines that one or more nodes contain the system resource identified by the resource_type and resource_id parameters, it sets bits in the return argument corresponding to those one or more nodes.

The resource_type parameter may specify a node in which case the locate system call returns a set of nodes in system 10 that are currently online. When a node is specified, the resource_id argument is ignored.

The resource-type parameter may be a file descriptor. For different file descriptors, the operating system uses different criteria for determining which nodes to include in the set of nodes returned to the user process. If rd_fd is a stream, the locate system call returns a node in return_arg where the memory containing a stream head resides (a stream is a general facility in UNIX for communication, such as interprocess communication). If rd_fd is a file, return_arg includes a set of one or more nodes that can directly access a disk where a file is stored. If rd_fd specifies a device, return_arg includes a set of one or more nodes that have efficient access to that device. Similar return arguments may be supplied if rd_fd specifies a socket, FIFO or remote file.

The resource_type parameter may specify a path. In this case, operating system 32 returns a set of nodes that are nearest to a resource identified by rd_pathname.

The resource_type parameter also may specify a shared memory segment. In this case, operating system 32 returns a set of nodes containing memory pages that are part of a shared memory segment specified by rd_shmid.

The resource_type parameter may also specify a process identification number. In this case, operating system 32 returns a set of nodes on which a process specified by rd_pid currently resides.

In step 74, operating system 32 uses the system resource identified in the request as a key to accessing a database entry. The database entry has one or more fields having information about the specified system resource, such as what nodes the system resource currently resides on. Operating system 32 then identifies a set of one or more nodes that contain the specified system resource from the database entry (step 76). For each node that contains the system resource, the operating system sets a bit in the return_arg parameter corresponding to that node.

The operating system then returns the return$_{13}$ arg parameter to the user process (step 78). Thus, the locate system call returns to Requesting process, a set of one or more nodes containing a specified system resource.

Process Creation

Figure 6:
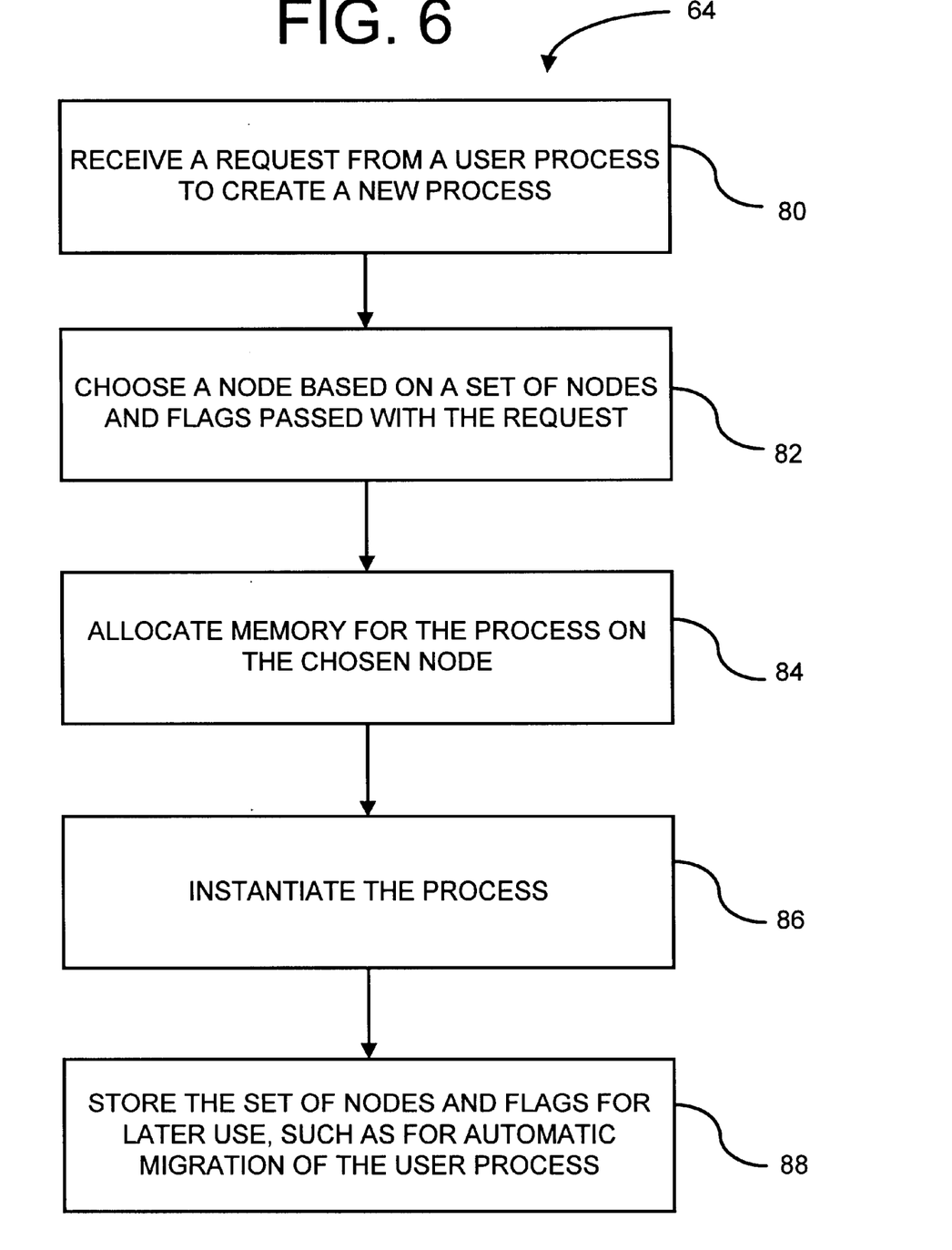
FIG. 6 is a flow chart of additional steps used for creating the process of FIG. 4.

FIG. 6 is a detailed flow chart of a method followed by the operating system for creating a process in response to the modified fork system call (step 64 of FIG. 4). The modified fork system call 64 uses the set of nodes returned from the locate system call (step 62 of FIG. 4). Specifically, in step 80, parent process 44 requests operating system 32 to create child process 42 on one of the nodes in the set identified from the locate system call. The return_arg parameter from the locate system call is used in a parameter denoted as node_set in the modified fork system call. The modified fork system call is called qfork for purposes of this application and has a format as follows:

qfork (node_set, flags)

This system call creates process 42. Process 42 (child process) is substantially identical to the calling process 44 (parent process). This means process 42 inherits the attributes from process 44. Process 42, however, does have a different process identification. There may be other differences between processes 42, 44 based on the operating system used and specific application.

Process 42 is created on a node specified by the qfork system call. The node chosen is based on the flags parameter and the node_set parameter, with the flags given priority. The flags include a large-memory flag, a small-memory flag, and an insist flag. If the small-memory flag is set, process 42 has very low memory requirements and is placed or stored on a node having the lightest CPU load even if it has little available memory. Conversely, if the large-memory flag is set, process 42 is placed or stored on a node with the most available memory, even though that node may have a high CPU load. In any event, the node chosen based on the small- and large-memory flags is a node from the set of nodes identified in the node_set parameter. If neither of these flags are set, a node is simply selected from the node set parameter. The node_set and flags are considered only advice on which node to place the process. The advice is not taken if all the nodes in the specified set have very high CPU loads or too little available memory. If the insist flag is set, however, the large- and small-memory flags and the node_set are no longer advisory as to where to store the process, but mandatory. Thus, with the insist flag set, operating system 32 places process 42 on one of the requested nodes regardless of whether those nodes have high CPU loads or too little memory. Too little memory may cause operating system 32 to move other processes to other nodes to make room for process 42. Other parameters may be used in the qfork system call if desired.

In step 82, operating system 32 chooses a node from the set of nodes based on the flags, the node_set parameter, CPU loads, and memory as set forth above. After the operating system chooses a node, all of the components 48, 50, 52, and 54 of process 42 are stored only on that node. Thus, the stack, page tables, program, and private data are all stored on the same node to maximize efficiency and reduce internode communication. The processor running the process is also on the same node.

In step 84, operating system 32 allocates memory for process 42 on a node chosen in step 82. Process 42 is then stored on the chosen node by instantiating (step 86) the process. This instantiation is accomplished by substantially copying process 44 into the memory allocated. For further details on how to allocate memory in a multinode environment see the application entitled Kernel Memory Allocator for Multiprocessor Computer System, U.S. patent application No. 09/028,285 and the application entitled User Specifiable Allocation Of Memory For Processes In A Multiprocessor Computer Having A Non-Uniform Memory Architecture, U.S. patent application No. 08/920,672, both of which are hereby incorporated by reference.

In step 88, operating system 32 stores the node_set parameter and the flags so that they can be taken into consideration in future migration of the user process. That is, due to load imbalance or changes in resource location, operating system 32 may choose to move process 42 to a different node. In so doing, the operating system takes the set of nodes and flags into consideration to determine where to move process 42. Thus, the user process request (step 80) is used by the operating system throughout the life of process 42 to make decisions on where to move the process. The functionality described in relation to step 88 is similar to the attach system call, described further below. Thus, the qfork system call results in an implied attachment to the system resources, so that if the system resource moves to a different node, the process also moves to that node.

Executing a Program

Figure 7:
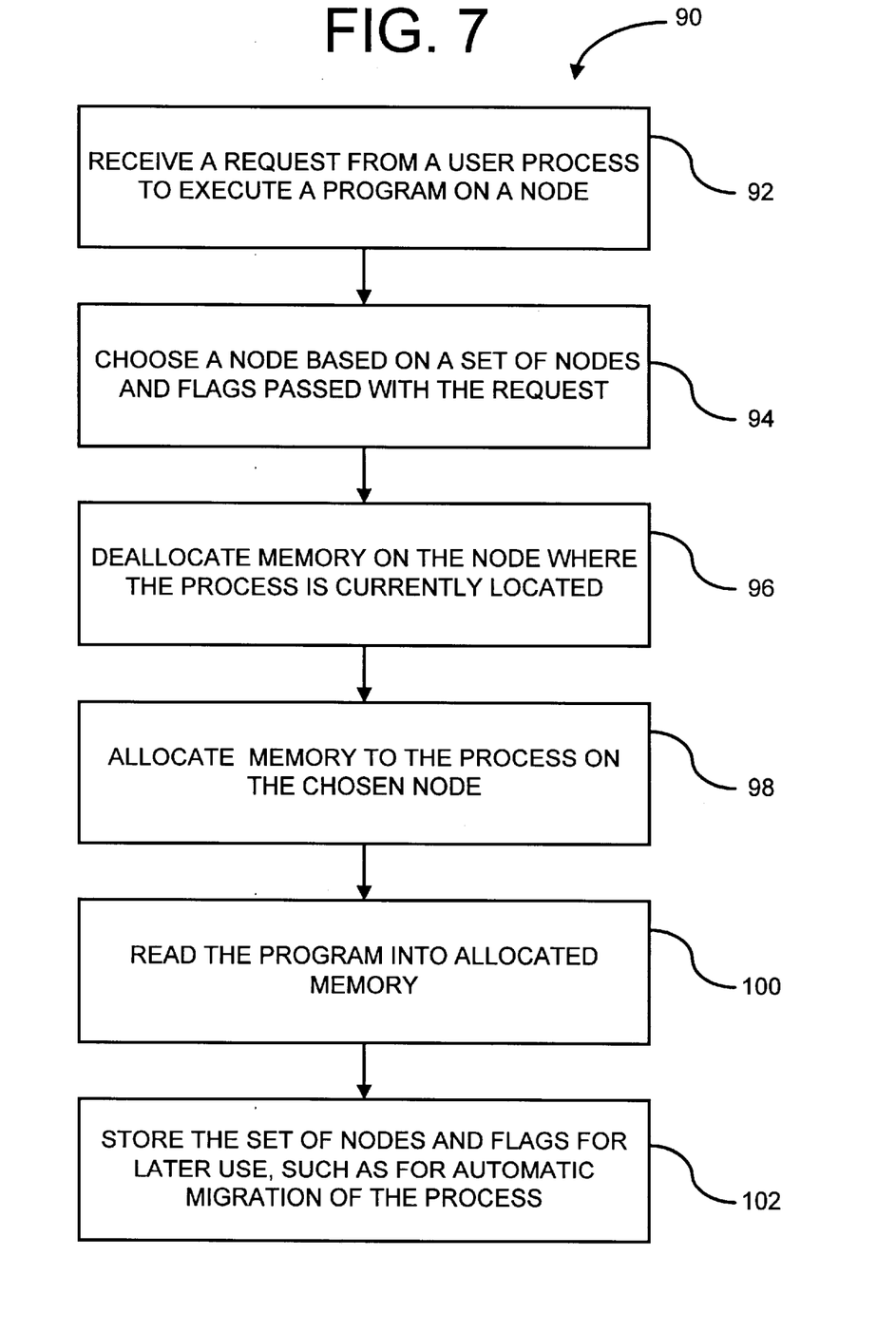
FIG. 7 is a flow chart of a method for executing a program on a specified node.

FIG. 7 shows a flow chart of a method followed by the operating system for executing a program on a specified node in response to a modified exec system call 90. Rather than placing a process on a specified node using the qfork system call and using a more traditional exec system call, the modified exec system call can be used in conjunction with a more traditional fork system call. The modified exec system call, called qexec for purposes of this application, requests the operating system to execute a program on a node having a specified system resource.

In step 92, a user process requests operating system 32 to execute program associated with that process on a node having a specified system resource.

An example qexec system call is as follows:

qexec (node_set, flags, file)

The qexec system call has three parameters: node_set, flags, and file. Other parameters can be used, such as other parameters used in a standard exec system call. The node_set parameter represents the set of nodes that a system resource resides on. This information can be obtained using the locate system call described above. The flags parameter is identical to that described in relation to the qfork system call, including large and small memory flags and an insist flag. Other flags may be used depending on the application. The file parameter is a path to the program to be executed.

In step 94, operating system 32 chooses a node based on the node_set parameter, the flags and CPU and memory availability. This is similar to step 82 (FIG. 6) in creating a process using the qfork system call.

In step 96, operating system 32 deallocates memory on the node where the process is currently stored. Memory is then allocated on the node chosen (step 98). After the memory is allocated, the process is instantiated on the chosen node. The process on the chosen node has the same process identification number as the process where the memory is deallocated. However, the process on the chosen node is not identical. For example, the stack and private data are initialized. The operating system then reads the program and associated initialization data (variables that have initialized values) designated by the file parameter into the new allocated memory (step 100). Alternatively, the program may be shared with another process on the same node, rather than being read. In any event, the program resides on the desired node and is executed.

In step 102, the operating system stores the node_set and flags passed in the qexec system call for use during automatic migration of the process. This is similar to step 88 (FIG. 6) described above.

Attaching a Process to a System Resource

Figure 8:
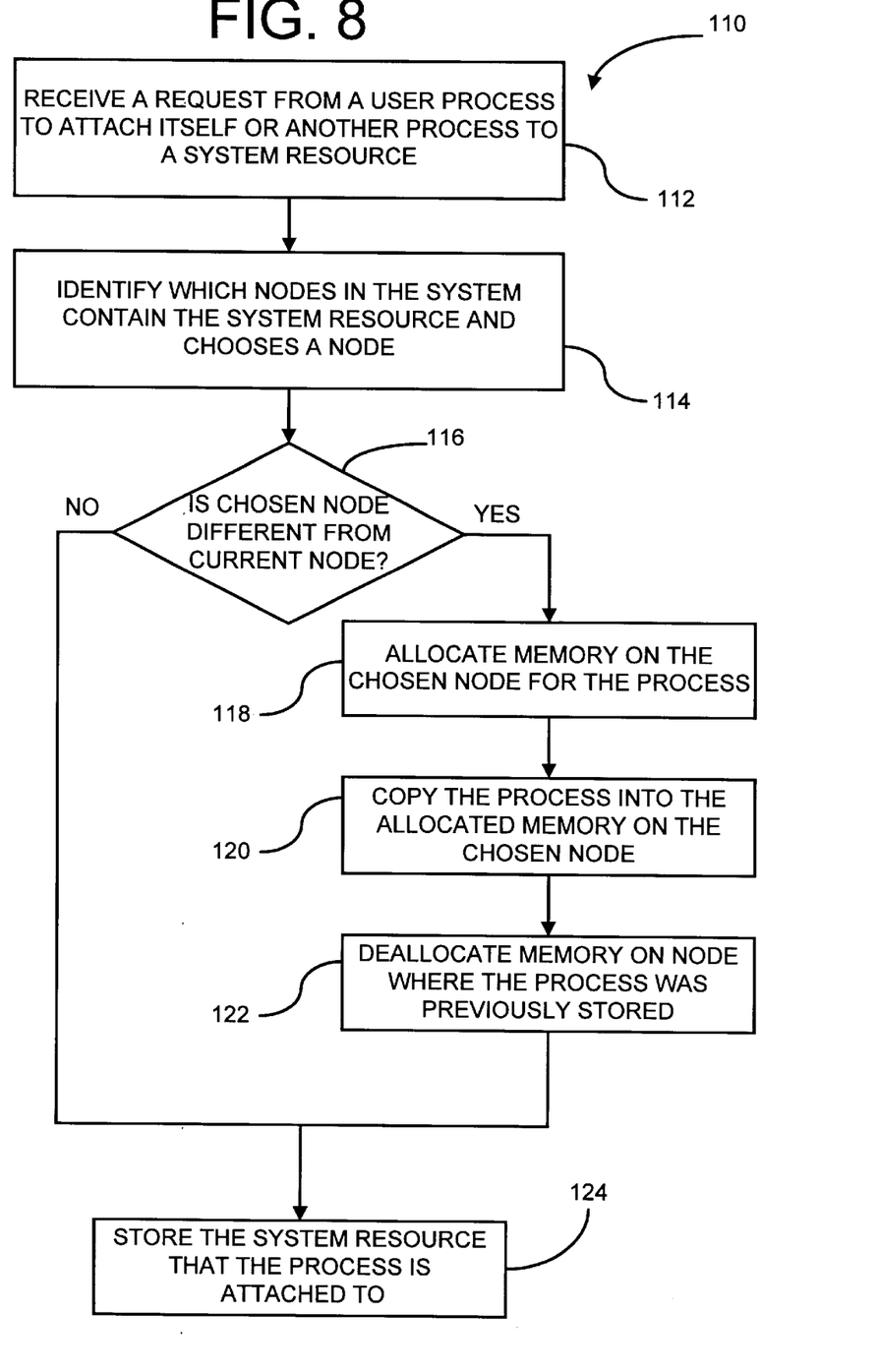
FIG. 8 is a flow chart of a method for attaching a process to a specified node or specified system resource.

FIG. 8 is a flow chart 110 of a method followed by the operating system for attaching a process to a system resource. A process attached to a system resource resides on the same node as the system resource. If the system resource moves to a different node or set of nodes, the process moves to a node that includes the resource. Thus, the process location is dependent upon the resource location.

In step 112, a user process makes a request to attach a process to a node containing a system resource. The system call is called attach for purposes of this application, an example of which is as follows:

attach (resource_type resource_id, flags, pid)

There are four parameters in the attach system call: resource_type, resource_id, flags, and pid. A different number of parameters may be used depending on the application. The resource_type and resource_id are used to identify a specific system resource. The use of these two parameters is described above in relation to the locate system call. The flags parameter is similar to that described for the qfork system call. The pid parameter is a process identification used for uniquely identifying a process in the system. The process identified by the pid is attached to the specified system resource as a result of the attach system call.

It is possible that due to high CPU loads or insufficient available memory, the operating system cannot move the process to the node having the system resource. In such a case, the operating system returns an error and advises the calling process to try again later.

In step 114, the operating system identifies or determines which nodes in the system contain the system resource. This is accomplished by taking steps similar to steps 74 and 76 in FIG. 5. That is, the system resource is used as a key for accessing a database entry. The database entry contains a field indicating the nodes that currently have access to the system resource. One node is chosen from the set of nodes.

The attach system call typically is used for moving the process at the time of the request. It is, however, possible that the node chosen for the process is the same node that the process is already located on. In that case, the process is not moved. Step 116 shows the decision made by the operating system based on whether the node chosen from a set of nodes differs from the current node that the process is located on. If the nodes are different, then the process is moved, as is shown in steps 118, 120 and 122. In step 118, new memory is allocated to the process on the chosen node. Step 120 shows that the process is then copied and stored into the newly allocated memory. The process in the newly allocated memory is substantially identical to the previous process, including having the same stack, private variables and process identification number. In step 122, memory is deallocated on the node where the process was previously stored.

Step 124 is carried out regardless of the decision in step 116. Step 124 shows that the system resource information that the process is attached to is stored for later migration purposes.

Once a process is attached to a system resource, the process moves to one of the nodes the system resource moves to. In the case of automatic migration, the operating system may detect an inefficiency in the execution of a process on a given node. This may be the result of insufficient memory, the CPU running the process is overloaded, etc. As a result, the process may be automatically moved to another node that contains the system resource. To accomplish the automatic migration, the operating system retrieves the information stored in step 124 and goes through a procedure similar to step 114 to again determine what node the process should be migrated to.

Although not shown, a detach system call may also be used to undo an attach system call. An example of the detach system call is as follows:

detach<pid_type, pid>

The pid is a process identifier. The detach system call does the opposite of the attach system call 110 by deleting or otherwise disabling the system resource information stored in step 124 of FIG. 8. A detached process no longer is attached to a system resource. Thus, when there is automatic migration due to CPU overload on a node, any processes that are detached may be moved independent of the system resource.

Having illustrated and described the principles of the invention in a preferred embodiment, it should be apparent to those skilled in the art that the preferred embodiment can be modified in arrangement and detail without departing from such principles.

For example, although the locate system call and qfork system call are described as separate system calls they may be combined, similar to the way the attach system call incorporates an aspect of the locate system call. For example, the qfork system call can be as follows:

qfork (resource_type, resource_id, flags) Similarly, the qexec system call can be as follows:

qexec (resource_type, resource_id, flags) In both of these system calls, the resource_type and resource_id identify a system resource, rather than a set of nodes. Functionality similar to the locate system call is built into this qfork and qexec system calls. Thus, the qfork system call specifies a system resource. The operating system identifies a set of nodes containing the system resource and chooses a node that the system resource resides on. The operating system then creates a process on that node. Similarly, with the qexec system call a program is executed on a node that contains a specified system resource. Step 88 in FIG. 6 and step 102 in FIG. 7 would also be changed so as to store the system resource information as in step 124 (FIG. 8), rather than node information.

Additionally, although the attach system call is shown as having parameters for a system resource, it may have parameters for a set of nodes instead. Thus, the attach system call could be as follows:

attach (node_set, flags, pid)

This system call is used in conjunction with the locate system call to identify a set of nodes that have a particular system resource. The operating system chooses one of the nodes in node_set to attach the process identified by the pid.

In view of the many possible embodiments to which the principles of the invention may be applied, it should be recognized that the illustrated embodiments are only an example of the invention and should not be taken as a limitation on the scope of the following claims. The steps described in a claim can be taken in any sequence unless their order is specified. We claim as the invention all that comes within the scope of these claims.

We claim:

1. In a multiprocessor computer system having an operating system and a shared memory distributed among multiple nodes, each node having one or more processors and local memory, a method of storing a process, the method comprising the following steps:

transmitting a first request from a user process of an application program to the operating system to store a process on a node having a specified system resource;

in response to the first user request, the operating system identifying to the user process a set of one or more nodes that contain the specified system resource;

transmitting a second request from the user process to the operating system to create a process on a node in the identified set of nodes, the request including advice on which node to store the process; and in response to the second user request, the operating system choosing a node from the identified set of nodes based on advice from the user process and storing the process on the chosen node.

2. The method of claim 1 wherein the user request is generated by a parent process and wherein the process stored on the chosen node is a child process which is substantially identical to the parent process.

3. The method of claim 2 wherein processes in the multiprocessor system have unique process identifications and wherein the child process has a different process identification than the parent process.

4. The method of claim 1 wherein the storing step includes moving the process from a first node to the chosen node and maintaining the same process identification.

5. The method of claim 1 further including allocating memory on the chosen node, copying the process into the allocated memory, and executing a program associated with the process.

6. The method of claim 1 further including storing the set of nodes that include the specified system resource in a memory location.

7. The method of claim 6 including:

detecting an inefficiency in execution of the process;

retrieving the stored set of nodes; and automatically moving the process to another node chosen from the set of nodes.

8. The method of claim 1 wherein the operating system is a UNIX-based operating system.

9. The method of claim 1 wherein the identifying step includes accessing a database entry using the system resource as a key, the database entry including nodes in the computer system that contain the system resource.

10. The method of claim 1 further including attaching the process to the system resource so that the process location is dependent upon the location of the system resource.

11. The method of claim 1 wherein the process comprises components including a program, a stack, and private data and all of the components are stored on the chosen node.

12. The method of claim 1, wherein the user advice is advisory or mandatory.

13. In a multiprocessor computer system having an operating system and a shared memory distributed among multiple nodes, each node having one or more processors and local memory, a method of creating a process, the method comprising the following steps:

transmitting a request from a user process of an application program to the operating system to create a process, the user request including a first parameter that indicates to the operating system a set of one or more nodes that the process should be stored on and a second parameter that contains advice on which node to store the process; and in response to the user request, the operating system choosing a node from the set of one or more nodes associated with the first parameter based on advice contained in the second parameter and creating the process on the chosen node.

14. The method of claim 13 wherein the first parameter is associated with the one or more nodes by having a system resource which is located on the one or more nodes.

15. The method of claim 14 further including determining which nodes on the system include the system resource.

16. The method of claim 13, wherein the first parameter is associated with the one or more nodes by including a set of bits that uniquely identify the nodes.

17. The method of claim 13 wherein the created process is a child process and the user process is a parent process.

18. In a multiprocessor computer system having an operating system and shared memory distributed among multiple nodes, each node having one or more processors and local memory, a method of determining the location of a system resource, the method comprising the following steps:

providing an operating system stored on one or more nodes for controlling the multiprocessor computer system;

executing a user process including a program on the multiprocessor computer system, the program including a system call to the operating system with a parameter associated with a system resource located on one or more nodes;

in response to the system call, the operating system using the parameter to access a database entry, ascertaining from the database entry a set of one or more nodes on the multiprocessor system that include the system resource, and identifying to the user process the set of one or more nodes.

19. The method of claim 18 including returning to the user process an argument that indicates which nodes include the system resource.

20. The method of claim 19 wherein the argument includes a set of bits, wherein each node is represented by a bit and the method further includes activating the bits corresponding to the nodes that include the system resource.

21. In a multiprocessor computer system having an operating system and shared memory distributed among multiple nodes, each node having one or more processors and local memory, a method of executing a program on the operating system, the method comprising the following steps:

transmitting a request from a user process to the operating system to execute a specified program, the request indicating a set of one or more nodes that the program should be stored on;

in response to the user request, the operating system:
choosing a node from the set of one or more nodes;
deallocating memory on a node where a process for executing the program is currently located;
instantiating a process on the chosen node including allocating memory for the process, the process having address space for storing the specified program;
copying the specified program to the address space of the process on the chosen node; and
executing the specified program from the chosen node.

22. The method of claim 21 further including receiving a request including a system resource parameter from a user process and returning to the user process a variable indicating one or more nodes that include the system resource.

23. In a multiprocessor computer system having an operating system and a shared memory distributed among multiple nodes, each node having one or more processors and local memory, a method of attaching a process to a system resource, the method comprising the following steps:

transmitting a request from a user process to the operating system to attach an existing process to a system resource;

in response to the request, the operating system:
determining which one or more nodes on the computer system contains the system resource;
choosing a first node from the one or more nodes that contains the system resource;
if the process is not located on the first node, moving the process to the first node;
storing the association of the system resource and process; and
in response to moving of the system resource to a second node, moving the process to the second node.

24. The method of claim 13 wherein the second parameter is advisory, and the operating system further considers CPU loads and memory usage in choosing a node to creating the process.

25. A computer-readable medium on which is stored one or more operating system functions that executes the following steps:

in response to a first request from a user process to store a process on a node having a specified system resource, identifying to the user process a set of one or more nodes that contain the specified system resource; and in response to a second request from a user process to create a process on a node in the identified set of nodes the request including advice on which node to store the process, choosing a node from the identified set of nodes based on advice from the user process and storing the process on the chosen node.

26. A computer-readable medium on which is stored an operating system function that executes the following steps:

in response to a request from a user process to attach an existing process to a system resource:
determining which one or more nodes on a multiprocessor computer system having multiple nodes contains the system resource;
choosing a first node from the one or more nodes that contain the system resource;
if the process is not located on the first node, moving the process to the first node;
storing the association of the system resource and process; and
in response to moving of the system resource to a second node, moving the process to the second node.

* * * * *